United States Patent

[11] 3,626,959

| [72] | Inventor | Louis S. Santomieri |
| | | Benicia, Calif. |
| [21] | Appl. No. | 8,580 |
| [22] | Filed | Feb. 4, 1970 |
| [45] | Patented | Dec. 14, 1971 |
| [73] | Assignee | Deseret Pharmaceutical Company, Inc. |
| | | Sandy, Utah |

[54] INTRAVENOUS FLOW CONTROL
5 Claims, 8 Drawing Figs.

[52] U.S. Cl. .................................................. 137/1,
251/342
[51] Int. Cl. .................................................. F03b 1/00,
F16k 31/58
[50] Field of Search .................................................. 137/1;
251/342, 344, 347

[56] References Cited
UNITED STATES PATENTS

| 2,692,751 | 10/1954 | Felver .......................... | 251/342 |
| 2,829,922 | 4/1958 | Osrow et al. .................. | 251/344 X |
| 2,946,555 | 7/1960 | Cantor .......................... | 251/342 |
| 2,964,292 | 12/1960 | Noir ............................. | 251/342 |
| 3,022,743 | 2/1962 | Engholdt ....................... | 137/815 X |
| 3,270,756 | 9/1966 | Hansen.......................... | 137/13 |
| 3,425,664 | 2/1969 | Niskin ........................... | 251/344 |
| 3,527,441 | 9/1970 | Fisher............................ | 251/347 |

*Primary Examiner*—Samuel Scott
*Attorney*—Lynn G. Foster

ABSTRACT: A valve for controlling the flow of intravenous fluid through a flexible tube either alone or in association with a reservoir, the valve including an exterior flexible sleeve disposed over an aperture or separation in the tube and a spool which is displaceable within and along the axis of the tube by squeezing the exterior of the sleeve and/or tube near one end of the spool. The spool has a tortuous fluid passageway which is obstructed so that fluid flow is prevented except when the obstruction is disposed opposite the aperture. The method includes adjusting the position of the spool along the axis of the tube to control the rate at which the fluid flows through the tube.

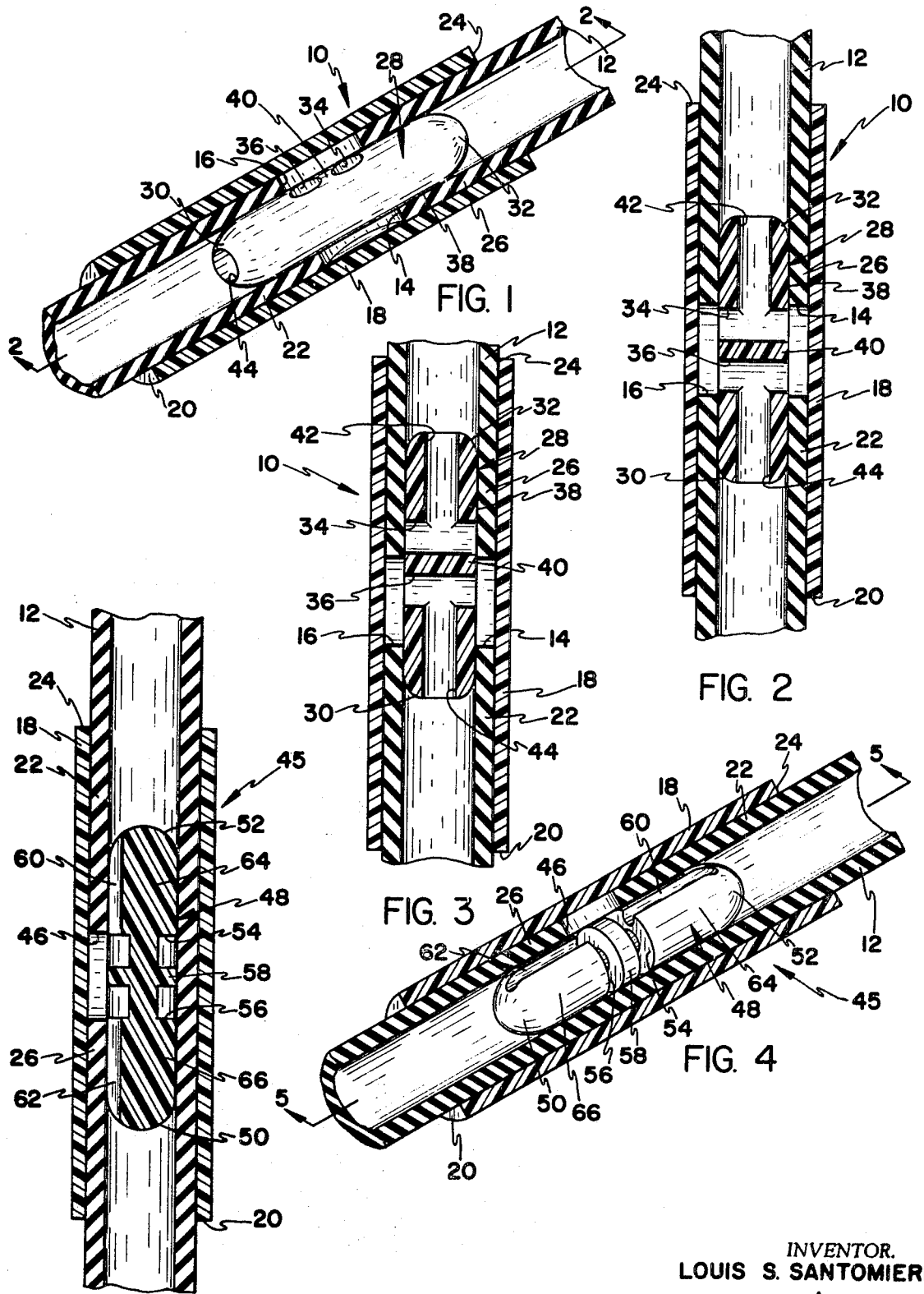

INVENTOR.
LOUIS S. SANTOMIERI
ATTORNEY

INTRAVENOUS FLOW CONTROL

BACKGROUND

1. Field of the Invention

The invention relates to valves and more particularly to spool valves and methods which regulate or meter intravenous and like fluid flow through a flexible tube across the valve.

2. The Prior Art

Valves which regulate intravenous and like fluid flow through a tube normally accommodate full on or full off positions. Commonly, no provision is made for controlling the rate at which fluid flows through the tube. Otherwise, complex regulating mechanisms have been required.

BRIEF SUMMARY AND OBJECTS OF THE INVENTION

Briefly, the invention provides a spool within a flexible tube, the spool being manually positionable along the axis of the tube to selectively accommodate a full on, a full off or a selectively regulated flow of intravenous or like fluid at a variable rate through the tube.

It is a primary object of the present invention to provide a novel valve and method.

Another significant object is the provision of a novel flow control apparatus.

Another important object of the invention is the provision for an improved method for controlling the flow of intravenous fluid through a flexible tube.

These and other objects and features of the present invention will become more fully apparent from the following description and appended claims taken in conjunction with the accompanying drawings.

BRIEF DESCRIPTION OF THE DRAWINGS

FIG. 1 is a fragmentary perspective view of one presently preferred valve embodiment of this invention with the tubing illustrated in longitudinal cross section to reveal the spool;

FIG. 2 is a cross section taken along line 2—2 of FIG. 1;

FIG. 3 is a cross section similar to FIG. 2 showing the spool valve in full-closed or "off" position.

FIG. 4 is a fragmentary perspective of another presently preferred valve embodiment of this invention with the tubing illustrated in longitudinal cross section to reveal the modified spool;

FIG. 5 is a cross section taken along lines 5—5 of FIG. 4;

DETAILED DESCRIPTION OF THE PREFERRED EMBODIMENT

The Embodiment of FIGS. 1-3

Figure 6:
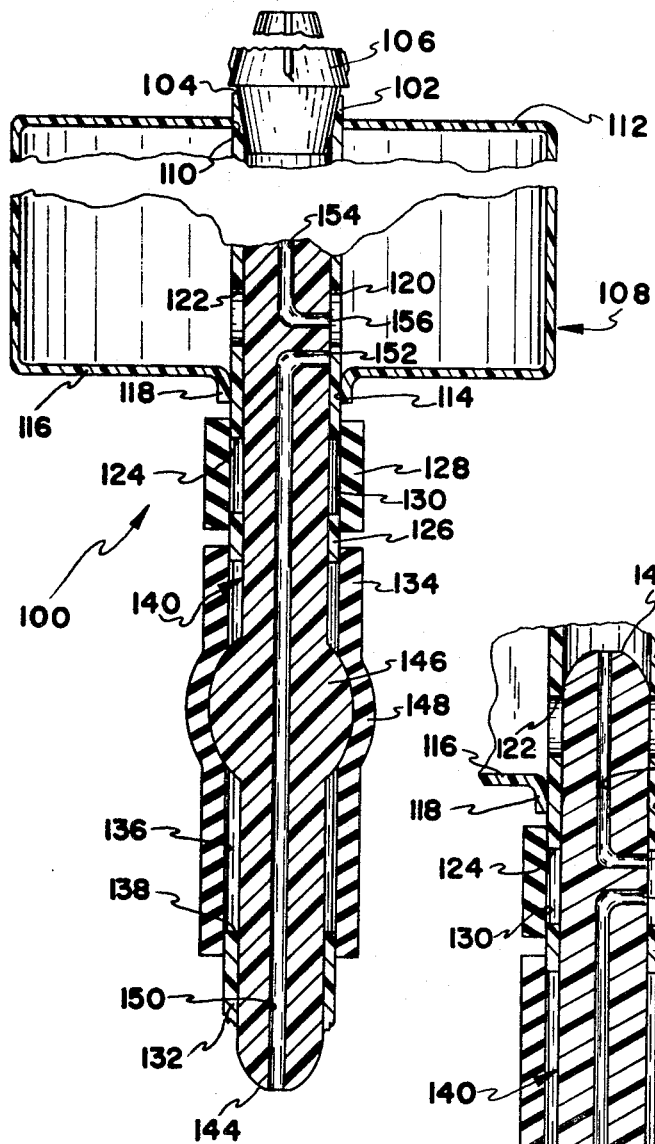
FIG. 6 is a longitudinal cross section of another presently preferred embodiment of the invention illustrating the spool in position to fill a reservoir.

Referring now to the valve of FIGS. 1-3, generally designated 10, a flexible tube 12, preferably formed of latex rubber, polyvinyl chloride or the like, is shown. The tube 12 may be an infusion tube, catheter or the like. Tube 12 has opposed apertures 14 and 16 disposed entirely through the walls of tube 12.

An external tube or sleeve 18 has an inside diametral dimension which is substantially equal to or just slightly less than the outside diametral dimension of the tube 12. Sleeve 18 is surmounted upon the tube 12 and is disposed over the apertures 14 and 16 so as to completely close the apertures. The leading end 20 of the sleeve 18 is lapped over a length 22 of the tube 12 and, if desired, may be sealed to the tube 12 by a suitable bonding agent so as to prevent flow of fluid between the tube 12 and the sleeve 18. Similarly, the trailing end 24 of the sleeve 18 is lapped over the length 26 of the tube 12 and, if desired, may be sealed to the tube 12. When the sleeve 18 is sealed to the tube 12, the lengths 22 and 26 may be severed and separated by a space (not shown) which space would take place of and assume the function of the apertures 14 and 16.

The sleeve 18 is preferably formed of transparent polypropylene or the like and is resiliently flexible so that the sleeve 18 may be squeezed to collapse the tube 12 along either length 22 or 26. Also, the transparency of sleeve 18 makes apertures 14 and 16 clearly visible for visual monitoring of flow.

If desired, appropriately sized and placed recesses on the inside of the tube 12 may be used in lieu of the apertures 14 and 16 and the sleeve 18.

An elongated spool generally designated 28 has a cylindrical body and rounded ends 30 and 32. Spool 28 may be formed of nylon or other synthetic essentially rigid material and has a diametral dimension which is essentially the same as the inside diametral dimension of the tube 12. Thus, fluid normally disposed in tube 12 is unable to flow between the tube 12 and the peripheral edge of spool 28.

Spool 28 has transverse bores 34 and 36 each parallel to the next and each intersecting the longitudinal axis of the spool 28. The bores 34 and 36 open at opposite peripheral locations on the surface 38 of the spool 28 so that a partition or obstruction 40 exists between the bores 34 and 36.

Bores 42 and 44 are disposed coaxially in the spool 28 and open at the ends 32 and 30 respectively of the spool 28. Bores 42 and 44 also intersect the transverse bores 34 and 36, respectively, at essentially midlength. Thus, bores 42 and 44 respectively form a T-configurated passageway with the bores 34 and 36.

When the spool 28 is in the position illustrated in FIGS. 1 and 2, fluid existing in the tube 12 is allowed to pass through the bores 42 and 34 and, thereafter around the obstruction 40 through passageways created by apertures 14 and 16 in the tube 12. Thereafter the fluid flows through the bores 36 and 44 are out through the leading end 30 of the spool 28.

When spool 28 is displaced somewhat in either direction, a part of either bore 34 or 36 will be occluded by the tube 12 thereby restricting the amount of fluid allowed to pass through the bores. Also, the spool 28 may be displaced sufficiently in either direction along the axis of tube 12 to allow the tube 12 to completely cover bore 34 as shown in FIG. 3. Alternatively, bore 36 could be closed by tube 12 or both bores 34 and 36 could be closed when the spool 28 is sufficiently axially displaced. In the closed position, no fluid would flow through the tube 12 across the spool 28.

The spool 28 is moved axially within the tube 12 by pinching the sleeve 18 and/or the tube 12 at a location near the rounded ends 30 or 32. As the tube 12 collapses around the end 30, the spool 28 will be displaced relative to the apertures 14 and 16 in a direction upward as viewed in FIG. 3. Also, when the tube 12 is collapsed near the end 32, the spool 28 will be displaced downwardly. Thus, the position of the spool 28 along the axis of tube 12 may be accurately controlled by squeezing the tube in the vicinity of the spool 28.

The Embodiment of FIGS. 4 and 5

The embodiment of FIGS. 4 and 5, generally designated 45, resembles the spool valve 10 in some respects, like parts having like numerals throughout. The sleeve 18 is surmounted upon the tube 12 in the manner above identified. Tube 12 is provided with a single aperture 46 disposed entirely through the wall of the tube 12 and which opens to the interior of sleeve 18. Fluid in the tube 12 is prevented from flowing between the tube 12 and the tube 18, such as by sealing the tube 18 to lengths 22 and 26 of the tube 12.

A spool generally designated 48 is normally disposed within the tube 12 and has an outside diametral dimension which is essentially the same as the inside diametral dimension of the tube 12. The spool 48 has an elongated body with rounded ends 50 and 52 and may be formed of nylon or other rigid synthetic resin.

The spool 48 is provided with side-by-side annular recesses 54 and 56 which are separated by annular disk or obstruction 58. The disk 58 has a transverse dimension which is less than the diametral dimension of aperture 46.

Axially aligned grooves 60 and 62 are disposed in the peripheral surface of the leading and trailing ends 64 and 66, respectively, of the spool 48. Each groove 60 and 62 communicates the corresponding annular recess 54 and 56 with the respective ends 52 and 50 of the spool 48. Thus, a passageway exists in the spool through the groove 60 and annular recess 54 and also through the groove 52 and annular recess 56. Communication between the passageways is obstructed only by the disk 58.

When the spool 48 is in the position illustrated in FIGS. 4 and 5, fluid will flow across the spool 48 by traversing groove 60 and recess 54 and, thereafter, passing around the obstruction or disk 58 at the aperture 46. The fluid thereafter flows through the recess 56 and groove 62. If desired, a sleeve 18 may be squeezed to collapse the tube 12 near one end of the spool 48 to displace the spool slightly from the position illustrated in FIGS. 4 and 5. Clearly, if desired, the tube 12 may be collapsed independent of the sleeve 18. When the spool is advanced along the axis of the tube 12, a portion of the annular recess 54 or 56 may be occluded as the distance between the disk 58 and the side of the aperture 46 is reduced. Thus, the rate of fluid flow across the spool 48 may be varied over a wide range. Also, if desired, the spool 48 may be displaced sufficiently to place the disk or obstruction 58 away from the aperture 46 to completely obviate flow of fluid across the spool 48.

It can be appreciated that fluid will flow across the spool 48 regardless of the orientation of the grooves 60 and 62 relative to the aperture 46. Thus, the position of the grooves 60 and 62 relative to the aperture 46 may be revolved through any number of degrees of rotation about the axis of the spool 48 without affecting the flow of fluid around the obstruction 58 through the aperture 46.

Figure 7:
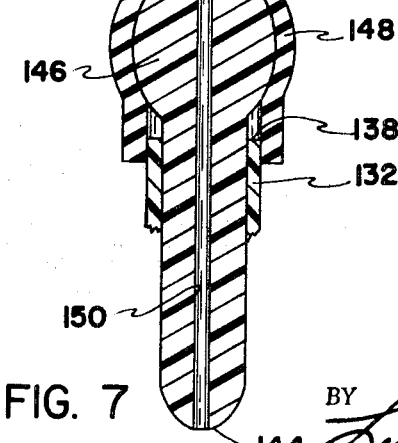
FIGS. 7 and 8 are fragmentary cross-sectional views similar to FIG. 6 respectively illustrating the spool in the reservoir bypass and reservoir-emptying positions.
Figure 8:
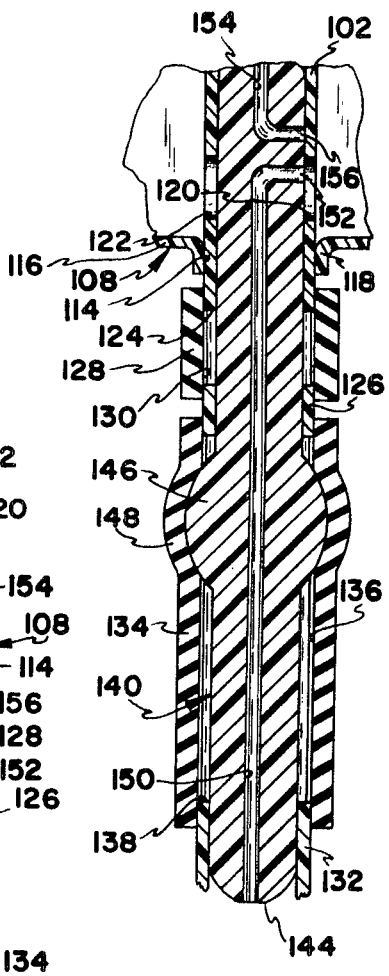

The Embodiment of FIGS. 6–8

Referring now to FIGS. 6–8, the valve generally designated 100 includes a flexible tube 102 having an open terminal end 104. The end 104 is adapted to receive an infusion coupling (not shown) in mating relation or, when desired, the tube 102 may be closed such as with a conventional plug 106.

A cylindrical reservoir 108 has a centrally disposed aperture 110 in the upper surface 112 and a centrally disposed aperture 114 in the lower end 116. The lower end 116 has an annular boss 118 formed by the outwardly turned peripheral edges of the reservoir at the aperture 114. Preferably, the tube 102 is situated within the apertures 110 and 114 and is mounted in fluidtight relation therein.

The tube 102 has opposed apertures 120 and 122 which communicate the interior of tube 102 with the interior of reservoir 108. The tube 102 terminates in a shoulder 124. A tube segment 126 is coaxially aligned with the tube 102 and it is spaced from the tube 102. The tube 102 and the tube segment 126 are joined by an annular collar 128 also preferably formed of flexible rubber or rubberlike material.

The collar 128 is mounted upon the exterior of tubes 102 and 126 and is preferably bonded or otherwise sealed in fluidtight relation to the tubes. An internal chamber 130 is formed by the spacing between the tubes 102 and 126.

Another flexible tube 132 is spaced a substantial distance from the tube segment 126 and is coaxially aligned with both tubes 102 and tube segment 126. The tube 132 and tube segment 126 are joined with an elastometric sleeve 134 preferably formed of latex rubber or the like. A sleeve 134 is bonded or otherwise suitably joined to the exterior of the segment 126 and the tube 132 so as to form a fluidtight seal. An elongated chamber 136 exists between the segment 126 and the leading end 138 of the tube 132.

A spool generally designated 140 is disposed within the tubes 102, 126 and 132, simultaneously. The spool 140 has rounded ends 142 and 144 and is preferably slightly larger in diametral dimension than the inside diametral dimension of tubes 102, 126, and 132 so that a fluid seal is formed between the periphery of the spool and the interior walls of the tubes while at the same time accommodating axial displacement of the spool 140 within the tubes.

Spool 140 has a bulbous enlargement 146 which is located so as to be disposed within the chamber 136 and which is larger in diametral dimension than the remainder of the spool 140. Thus, the bulbous portion 146 causes an annular bulge to exist in the sleeve 134. The bulbous portion 146 may be used to identify the axial location of the spool 140 relative to the reservoir 108 and, additionally, accommodates facile displacement of the spool 140 within the tubes 120, 126 and 132 by merely finger squeezing the sleeve 134 at the bulging portion 148.

An axially directed bore 150 opens at the end 144 and also opens at a side port 152 intermediate the length of the spool 140. A second bore 154 axially aligned with bore 150 opens at the end 142 and also opens at port 154, port 154 being radially aligned with an axially displaced from the port 152. The space between ports 154 and 152 is less than the axial dimension of chamber 130 (see FIG. 7).

In the operation of the valve embodiment 100, it can be observed by reference to FIG. 6 that the spool 140 is in an axial position which closes port 152 and opens port 154 to the interior of the reservoir 108. When the plug 106 is removed and fluid is conducted through the tube 102, the reservoir 108 may be filled with fluid, the fluid being prevented from entering bore 150 because the tube 102 closes port 152. When the reservoir 108 is filled, the spool 140 may be axially displaced to the position of FIG. 8, so that the port 152 is aligned with aperture 120. In this position, the fluid in reservoir 108 will pass through the bore 150 into the tube 132. Also, additional fluid is prevented from entering the reservoir 108 because the tube 102 closes port 156.

If desired, the spool 140 may be displaced downwardly from the position illustrated in FIG. 8 to the position illustrated in FIG. 7. As shown in FIG. 7, ports 156 and 152 both open simultaneously into the chamber 130. The upper end of the spool 142 closes apertures 120 and 122 into the reservoir 108 so that fluid conducted by tube 102 is carried through the bore 154, chamber 130, and, thereafter, bore 150. Thus, the reservoir 108 is closed to fluid exchange and fluid is allowed to flow from the tube 102 to the tube 132.

It can also be appreciated by reference to the figures that fluid in the tube 102 may be completely stopped by positioning the ports 152 and 156 simultaneously against the internal surface of tube 102. Moreover, the spool could be displaced sufficiently downward to expose the end 142 and bore 154 to both apertures 120 and 122 so that fluid would pass from port 156 to port 152 in chamber 136.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by U.S. Letters Patent is:

1. In a method of controlling the flow of fluid between a flexible tube having an axially displaceable spool therein and a reservoir, the steps of:
   squeezing the flexible tube adjacent the end of the spool to place a first passageway in the spool in communication with the interior of the reservoir while simultaneously obstructing a second passageway in the spool so that fluid passing through the first passageway will enter and be retained in the reservoir;
   displacing the spool so that the first passageway is obstructed and the second passageway is in communication with the reservoir whereby fluid in the reservoir escapes through the second passageway; and
   disposing the spool so that both first and second passageways communicate one with another and bypass the reservoir.

2. Valve structure for controlling the flow of fluid compris-ing:

a flexible tube having a hollow interior which hollow interior comprises an internal bypass chamber at a predetermined site; and an axially displaceable plug disposed within the tube proximate the bypass chamber of the hollow interior, the plug defining influent and effluent fluid passageway means on opposite sides of a barrier of the plug, which barrier prohibits at all times axial flow when the plug is manually squeezed along the axis of the tube to a position axially remote from the bypass chamber, the influent and effluent fluid passageway means respectively accommodating fluid flow to and from the barrier only when the plug has been manually squeezed along the axis of the tube to a position where the fluid passageway means are to some degree in registry with the bypass chamber of the interior of the tube whereby fluid flows through the bypass chamber around the barrier between the two passageway means to the extent of said registry.

3. A valve for controlling the flow of fluid comprising:

a fluid-conducting tube having at least one bypass opening therein;

an enclosure surmounting the tube adjacent the bypass opening so that the bypass opening is covered by the enclosure; and a spool axially displaceable within the tube and normally forming an obstruction to fluid flow with the inner periphery of the tube when remote from the enclosure, the spool being contoured to define separate influent and effluent flow paths and an obstruction therebetween which prevents fluid flow across the spool between the flow paths except when the obstruction is disposed opposite the bypass opening in the tube so that the influent path communicates to the effluent flow path from the bypass opening, the obstruction comprising a generally annular disk having a cross-sectional dimension essentially the same as the inside cross-sectional dimension of the tube, and wherein the flow paths comprise annular recesses at the surface of the spool adjacent the disk, each recess being connected with an axially directed passageway disposed in the periphery of the spool from the annular recess to respective opposite ends of the spool.

4. A valve for controlling the flow of fluid comprising:

a fluid-conducting tube having at least one bypass opening therein;

an enclosure surmounting the tube adjacent the bypass opening so that the opening is covered by the enclosure; and a spool axially displaceable within the tube and normally forming an obstruction to fluid flow with the inner periphery of the tube when remote from the enclosure, the spool being contoured to define separate influent and effluent flow paths and an obstruction therebetween which prevents fluid flow across the spool between the flow paths except when the obstruction is disposed opposite the bypass opening in the tube so that the influent flow path communicates to the effluent flow path from the bypass opening, the enclosure comprising a fluid reservoir in communication with the bypass opening in the fluid-conducting tube, the spool being selectively positionable within the tube relative to the bypass opening to (a) conduct fluid into the reservoir, (b) conduct fluid out of the reservoir and (c) bypass the reservoir at the election of the user.

5. A valve as defined in claim 4 wherein the spool comprises a contoured cross-sectionally enlarged portion to identify the position of the spool within the tube and to accommodate facile finger displacement of the spool.

* * * * *